(12) United States Patent
Chu et al.

(10) Patent No.: US 10,615,449 B2
(45) Date of Patent: Apr. 7, 2020

(54) ELECTRODE MATERIAL FOR SECONDARY BATTERY AND SECONDARY BATTERY

(71) Applicant: National Tsing Hua University, Hsinchu (TW)

(72) Inventors: Yu-Ying Chu, Hsinchu (TW);
Ying-Chan Hung, Hsinchu (TW);
Han-Yi Chen, Hsinchu (TW);
Tri-Rung Yew, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 34 days.

(21) Appl. No.: 16/009,229

(22) Filed: Jun. 15, 2018

(65) Prior Publication Data

US 2019/0305357 A1 Oct. 3, 2019

(30) Foreign Application Priority Data

Mar. 27, 2018 (TW) .............................. 107110384 A

(51) Int. Cl.
*H01M 10/052* (2010.01)
*H01M 4/485* (2010.01)
*H01M 4/131* (2010.01)
*H01M 4/505* (2010.01)
*H01M 4/525* (2010.01)
*H01M 4/38* (2006.01)

(52) U.S. Cl.
CPC ......... *H01M 10/052* (2013.01); *H01M 4/131* (2013.01); *H01M 4/382* (2013.01); *H01M 4/485* (2013.01); *H01M 4/505* (2013.01); *H01M 4/525* (2013.01)

(58) Field of Classification Search
CPC .... H01M 10/052; H01M 4/131; H01M 4/382; H01M 4/485; H01M 4/505; H01M 4/525
See application file for complete search history.

(56) References Cited

U.S. PATENT DOCUMENTS 9,716,273 B2 7/2017 Hong et al.
2013/0216903 A1 8/2013 Pitteloud

FOREIGN PATENT DOCUMENTS

| CN | 102683668 | 9/2012 |
|---|---|---|
| CN | 103337615 | 10/2013 |
| CN | 103346307 | 10/2013 |
| JP | H07057780 | 3/1995 |
| JP | H10326621 | 12/1998 |
| JP | H11345615 | 12/1999 |
| JP | 2002145623 | 5/2002 |

(Continued)

OTHER PUBLICATIONS

S. Bhuvana, H. B. Ramalingam, G. Thilakavathi, K. Vadivel. Structural, optical and magnetic properties of (Ni—Mn) co-doped tin oxide nanoparticles, Materials Technology, vol. 32(5), 2017, 305-309.*

(Continued)

*Primary Examiner* — Carlos Barcena
(74) *Attorney, Agent, or Firm* — JCIPRNET

(57) ABSTRACT

An electrode material for a secondary battery and a secondary battery are provided. The electrode material for the secondary battery includes tin-manganese-nickel-oxide. The secondary battery includes a cathode, an anode, an electrolyte, and a package structure, wherein the anode includes the electrode material for the secondary battery.

6 Claims, 2 Drawing Sheets

(56) References Cited

FOREIGN PATENT DOCUMENTS

| JP | 2015197978 | 11/2015 | | |
|---|---|---|---|---|
| JP | 2015536018 | 12/2015 | | |
| JP | 2016192309 | 11/2016 | | |
| JP | 2016192310 | 11/2016 | | |
| JP | 2017107796 | 6/2017 | | |
| TW | 523958 | 3/2003 | | |
| TW | 201322527 | 6/2013 | | |
| WO | WO-2010002084 A1 * | 1/2010 | ............ | H01M 4/131 |
| WO | 2017119411 | 7/2017 | | |

OTHER PUBLICATIONS

"Office Action of Taiwan Counterpart Application," dated Sep. 10, 2018, pp. 1-6.
"Office Action of Japan Counterpart Application," dated Aug. 27, 2019, p. 1-p. 4.

* cited by examiner

ELECTRODE MATERIAL FOR SECONDARY BATTERY AND SECONDARY BATTERY

CROSS-REFERENCE TO RELATED APPLICATION

This application claims the priority benefit of Taiwan application serial no. 107110384, filed on Mar. 27, 2018. The entirety of the above-mentioned patent application is hereby incorporated by reference herein and made a part of this specification.

BACKGROUND OF THE INVENTION

Field of the Invention

The invention relates to an electrode material and a battery, and more particularly, to an electrode material for a secondary battery and a secondary battery.

Description of Related Art

The market demand for a secondary lithium battery with characteristics such as rechargeability, light weight, high voltage value, and high energy density has been growing in recent years. As a result, current performance requirements for the secondary lithium battery such as lightweight, durability, high voltage, high energy density, and high safety have also become higher. In particular, the secondary lithium battery has a rather high potential in the application and expandability of light electric vehicles, electric vehicles, and the large-scale power storage industry.

The most common commercially-available electrode material is graphite. However, the capacity of graphite (theoretical value of 372 mAh/g) is low, and therefore the resulting battery performance is limited.

Therefore, the search for an electrode material for a secondary battery having high stability and high capacity is an object for those skilled in the art.

SUMMARY OF THE INVENTION

The invention provides an anode material for a secondary battery and a secondary electrode formed thereby having good stability and high capacity.

The invention provides a cathode material for a secondary battery and a lithium electrode formed thereby having good stability and high capacity.

The anode material for the secondary battery of the invention includes tin-manganese-nickel (Sn—Mn—Ni)-oxide.

In an embodiment of the invention, the Sn—Mn—Ni-oxide is represented by formula (1) below, $$Sn_xMn_yNi_zO_w \qquad (1),$$

wherein $0.1 \leq x \leq 0.9$, $0 \leq y \leq 0.9$, $0.1 \leq z \leq 0.9$, and $(x+y+z)/2 < w < (x+y+z) \times 3$.

In an embodiment of the invention, the Sn—Mn—Ni-oxide is, for instance, a monocrystalline, microcrystalline, polycrystalline, or amorphous material.

In an embodiment of the invention, the anode material for the secondary battery is, for instance, single-phase or multi-phase.

In an embodiment of the invention, the anode material for the secondary battery may further include a binary metal oxide formed by an oxygen element and one of Mn, Ni, and Sn elements, a ternary metal oxide formed by an oxygen element and two of Mn, Ni, and Sn elements, or a combination thereof.

The secondary battery of the invention includes a cathode, an anode, an electrolyte, and a package structure. The cathode and the anode are separately disposed and the anode includes the anode material for the secondary battery. The electrolyte is disposed between the cathode and the anode. The package structure covers the anode, the cathode, and the electrolyte.

In an embodiment of the invention, the secondary battery further includes a separator. The separator is disposed between the anode and the cathode, the separator, the anode, and the cathode define a housing region, and the electrolyte is disposed in the housing region.

The cathode material for the secondary battery of the invention includes the lithium-tin-manganese-nickel (Li—Sn—Mn—Ni)-oxide represented by formula (2), $$Li_vSn_xMn_yNi_zO_w \qquad (2),$$

wherein $v \geq 0$, $0.1 \leq x \leq 0.9$, $0.1 \leq y \leq 0.9$, $0.1 \leq z \leq 0.9$, and $(x+y+z)/2 < w < (x+y+z) \times 3$.

In an embodiment of the invention, the Li—Sn—Mn—Ni-oxide is, for instance, a monocrystalline, microcrystalline, polycrystalline, or amorphous material.

In an embodiment of the invention, the cathode material for the secondary battery is, for instance, single-phase or multi-phase.

In an embodiment of the invention, the cathode material for the secondary battery may further include a ternary metal oxide formed by a lithium and oxygen element and one of Mn, Ni, and Sn, a quaternary metal oxide formed by a lithium and oxygen element and two of Mn, Ni, and Sn, or a combination thereof.

The lithium battery of the invention includes a cathode, an anode, an electrolyte, and a package structure. The cathode and the anode are separately disposed and the cathode includes the cathode material for the secondary battery. The electrolyte is disposed between the cathode and the anode. The package structure covers the anode, the cathode, and the electrolyte.

In an embodiment of the invention, the lithium battery further includes a separator. The separator is disposed between the anode and the cathode, the separator, the anode, and the cathode define a housing region, and the electrolyte is disposed in the housing region.

Based on the above, the electrode material for the secondary battery of the invention may be applied in a secondary battery to provide the secondary battery with good stability, battery efficiency, and charge and discharge cycle life.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
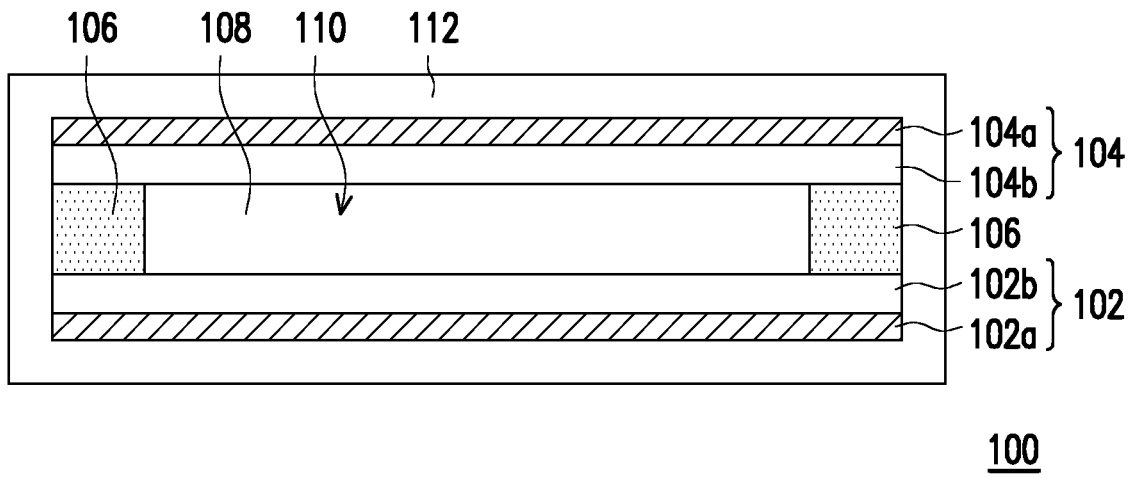
FIG. 1 is a cross section of a lithium battery according to an embodiment of the invention.

In the present specification, a range represented by "a numerical value to another numerical value" is a schematic representation for avoiding listing all of the numerical values in the range in the specification. Therefore, the recitation of a specific numerical range covers any numerical value in the numerical range and a smaller numerical range defined by any numerical value in the numerical range, as is the case with the any numerical value and the smaller numerical range stated explicitly in the specification.

To prepare an electrode material applicable for a secondary battery to provide the secondary battery with good stability and high capacity, the invention provides an anode material and a cathode material that can achieve the advantages above. In the following, embodiments are provided to describe actual implementations of the invention.

In the present embodiment, the anode material of the invention includes tin-manganese-nickel oxide (Sn—Mn—Ni-oxide). In an embodiment, the Sn—Mn—Ni-oxide is represented by formula (1) below, $$Sn_xMn_yNi_zO_w \quad (1),$$

in formula (1), $0.1 \le x \le 0.9$, $0.1 \le y \le 0.9$, $0.1 \le z \le 0.9$, and $(x+y+z)/2 < w < (x+y+z) \times 3$. If x, y, z, and w are within the ranges above, then the resulting secondary battery has good charge and discharge capacity and increased capacity retention rate.

In the present embodiment, the forming method of the Sn—Mn—Ni-oxide represented by formula (1) is, for instance, a solid-state method, evaporation, sputtering, vapor deposition, hydrothermal method, or coprecipitation method. However, the process of the invention is not limited thereto.

In the present embodiment, the Sn—Mn—Ni-oxide of the invention is, for instance, a monocrystalline, microcrystalline, polycrystalline, or amorphous material. In an embodiment, the average particle size of the Sn—Mn—Ni-oxide is, for instance, 100 um or less. If the average particle size of the Sn—Mn—Ni-oxide is within the range above, then the Sn—Mn—Ni-oxide may be used for the forming of an anode with good properties. In an embodiment in which the Sn—Mn—Ni-oxide is formed using a solid-state method, to obtain the Sn—Mn—Ni-oxide having a specific average particle size range, grinding may be performed using a mortar, ball mill, sand grinding machine, vibrating ball mill, or planet ball mill, but the invention is not limited thereto.

In the present embodiment, the anode material of the invention is single-phase or multi-phase. In an embodiment, the anode material of the invention may only include the Sn—Mn—Ni-oxide (i.e., quaternary metal oxide) represented by formula (1). In another embodiment, the anode material of the invention may further include binary metal oxide, ternary metal oxide, or a combination thereof. The binary metal oxide is, for instance, a binary metal oxide formed by an oxygen element and one of Mn, Ni, and Sn elements. The ternary metal oxide is, for instance, a ternary metal oxide formed by an oxygen element and two of Mn, Ni, and Sn elements. In the present embodiment, the binary metal oxide and ternary metal oxide are formed in the same process as the Sn—Mn—Ni-oxide represented by formula (1).

The Sn—Mn—Ni-oxide represented by formula (1) of the invention may be applied in the anode material for the secondary battery. More specifically, the Sn—Mn—Ni-oxide represented by formula (1) of the invention may be applied in the anode material for a lithium battery or sodium battery.

In the present embodiment, the cathode material of the invention includes the Li—Sn—Mn—Ni-oxide represented by formula (2) below, $$Li_vSn_xMn_yNi_zO_w \quad (2),$$

in formula (2), $v \ge 0$, $0.1 \le x \le 0.9$, $0.1 \le y \le 0.9$, $0.1 \le z \le 0.9$, and $(x+y+z)/2 < w < (x+y+z) \times 3$. If x, y, z, and w are within the ranges above, then the resulting secondary battery has good charge and discharge capacity and increased capacity retention rate.

In the present embodiment, the forming method of the Li—Sn—Mn—Ni-oxide represented by formula (2) is, for instance, a solid-state method, evaporation, sputtering, vapor deposition, hydrothermal method, or coprecipitation method. However, the process of the invention is not limited thereto.

In the present embodiment, the Li—Sn—Mn—Ni-oxide of the invention is, for instance, a monocrystalline, microcrystalline, polycrystalline, or amorphous material. In an embodiment, the average particle size of the Li—Sn—Mn—Ni-oxide is, for instance, 100 um or less. If the average particle size of the Li—Sn—Mn—Ni-oxide is within the range above, then the Li—Sn—Mn—Ni-oxide may be used to form a good cathode. In an embodiment in which the Li—Sn—Mn—Ni-oxide is formed using a solid-state method, to obtain the mixed oxide of Li and metal having a specific average particle size range, grinding may be performed using a mortar, ball mill, sand grinding machine, vibrating ball mill, or planet ball mill, but the invention is not limited thereto.

In the present embodiment, the cathode material of the invention is single-phase or multi-phase. In an embodiment, the cathode material of the invention may only include the Li—Sn—Mn—Ni-oxide represented by formula (2). In another embodiment, the cathode material of the invention may further include an oxide of lithium and one metal, an oxide of lithium and two metals, or a combination thereof. The oxide of lithium and one metal is, for instance, an oxide of lithium and one metal formed by a lithium and oxygen element and one of Mn, Ni, and Sn. The oxide of lithium and two metals is, for instance, an oxide of lithium and two metals formed by a lithium and oxygen element and two of Mn, Ni, and Sn. In the present embodiment, the oxide of lithium and one metal and the oxide of lithium and two metals are formed in the same process as the Li—Sn—Mn—Ni-oxide represented by formula (2).

The Li—Sn—Mn—Ni metal oxide of the invention may be applied in the cathode material for a secondary battery. More specifically, the Li—Sn—Mn—Ni metal oxide of the invention may be applied in the cathode material for a lithium battery.

In the following, the lithium battery including the electrode material of the invention is described.

FIG. 1 is a cross section of a lithium battery according to an embodiment of the invention. Referring to FIG. 1, a lithium battery 100 includes an anode 102, a cathode 104, an electrolyte 108, and a package structure 112.

The anode 102 includes an anode metal foil 102a and an anode material 102b, wherein the anode material 102b is disposed on the anode metal foil 102a via coating, sputtering, hot pressing, sintering, physical vapor deposition, or chemical vapor deposition. The anode metal foil 102a is, for instance, a copper foil, nickel foil, or high-conductivity stainless steel foil.

The anode material 102b is, for instance, carbon material, lithium metal, lithium alloy, or metal oxide. The carbon material, for instance, carbon powder, graphite, carbon fiber, carbon nanotube, graphene, or a mixture thereof. The lithium alloy is, for instance, Li—Al, Li—Pb, Li—Sn, Li—Al—Sn, or Li—Ga. In an embodiment, the metal oxide is, for instance, Sn—Mn—Ni-oxide represented by formula (1). In the present embodiment, the anode 102 is an electrode plate formed by the anode metal foil 102a and the anode material 102b. In another embodiment, the anode 102 may also only include the anode material 102b.

The cathode 104 and the anode 102 are separately disposed. The cathode 104 includes a cathode metal foil 104a and a cathode material 104b, wherein the cathode material 104b is disposed on the cathode metal foil 104a via coating, sputtering, hot pressing, sintering, physical vapor deposition, or chemical vapor deposition. The cathode metal foil 104a is, for instance, aluminum foil, nickel foil, or high-conductivity stainless steel foil. The cathode material 104b is, for instance, Li—Sn—Mn—Ni-oxide, and in an embodiment, the Li—Sn—Mn—Ni-oxide is the Li—Sn—Mn—Ni-oxide represented by formula (2).

In an embodiment, the lithium battery 100 may further include a polymer binder. The polymer binder reacts with the anode 102 and/or the cathode 104 to increase the mechanical properties of the electrode(s). Specifically, the anode material 102b can be adhered to the anode metal foil 102a via the polymer binder, and the cathode material 104b can be adhered to the cathode metal foil 104a via the polymer binder. The polymer binder is, for instance, polyvinylidene difluoride (PVDF), styrene-butadiene rubber (SBR), polyamide, melamine resin, or a combination thereof.

In an embodiment, the lithium battery 100 may further include a conductive material. The conductive material is, for instance, natural graphite, artificial graphite, carbon black, acetylene black, Ketjen black, carbon whisker, carbon fiber, metal powder, metal fiber, or a conductive ceramic material.

The electrolyte 108 is disposed between the anode 102 and the cathode 104. The electrolyte 108 includes liquid-state, gel-state, molten salt-state, and solid-state electrolyte.

In the present embodiment, the lithium battery 100 may further include a separator 106. The separator 106 is disposed between the anode 102 and the cathode 104, the separator 106, the anode 102, the cathode 104 define a housing region 110, and the electrolyte 108 is disposed in the housing region 110. The material of the separator 106 is an insulating material such as polyethylene (PE), polypropylene (PP), or a composite structure (such as PE/PP/PE) formed by the above materials.

In the present embodiment, the lithium battery 100 includes the separator 106 to separate the anode and the cathode and allow ions to pass through, but the invention is not limited thereto. In another embodiment, the electrolyte 108 is a solid-state electrolyte, and the lithium battery 100 may not include a separator.

The package structure 112 covers the anode 102, the cathode 104, and the electrolyte 108. The material of the package structure 112 is, for instance, aluminum foil. In the present embodiment, the lithium battery 100 has the structure shown in FIG. 1, but the invention is not limited thereto. In some embodiments, the lithium battery may have a structure in which the anode, the cathode, and an optional separator are wound to form a winding structure or a laminated structure formed by a flat sheet laminate. In the present embodiment, the lithium battery is, for instance, a paper-type battery, button-type battery, coin-type battery, laminated-type battery, cylindrical-type battery, or square-type battery.

In the following, experimental examples are provided to describe the invention, but the invention is not limited to the following examples.

Example 1

Preparation of Electrode Material

Sn-containing precursor, Mn-containing precursor, and Ni-containing precursor powders were respectively grinded using a 2D ball mill, and the Sn-containing precursor, Mn-containing precursor, and Ni-containing precursor powders were mixed and pressurized into green pellets (diameter of 1 cm). The green pellet was heated in a high-temperature furnace. The heating rate was 5° C./minute, and the temperature was kept at 100° C. for 2 hours to evaporate moisture. Next, the temperature was increased to 1000° C. or higher and maintained for 10 hours or more and then cooled to room temperature. The sintered Sn—Mn—Ni-oxide block was broken and the powder was grinded.

Preparation of Half Battery

A Sn—Mn—Ni-oxide, conductive carbon (Super P), and polymer binder (poly(vinylidene fluoride) (PVDF)) were dissolved in a N-methylpyrrolidone (NMP) solvent and mixed at a weight ratio of 7:2:1. Five zirconia balls (diameter of 3 mm) and 0.2 g of zirconia balls (diameter of 1 mm) were added, and mixing was performed using a stirrer (revolution speed of 2000 rpm and rotation speed of 800 rpm) for 30 minutes.

Next, the slurry was coated on a copper foil collector using a scraper (50 um) to evenly level the slurry, and the copper coil electrode sheet was placed in a vacuum oven and dried at 110° C. for 12 hours. The dried copper foil electrode sheet was cut into an anode electrode sheet having a diameter of 12.8 mm using a cutting machine.

In the present embodiment, a lithium metal was used as an opposite electrode (thickness of 0.45 mm). $LiPF_6$ was dissolved in a mixture of ethylene carbonate (EC) and diethyl carbonate (DEC) (volume ratio: EC:DEC=1:1) to prepare an electrolyte having a concentration of 1 M, wherein $LiPF_6$ was used as the lithium salt in the electrolyte.

The anode electrode sheet, lithium metal, separator (Celgard, 2400 films, PP), and electrolyte were formed into a button-type battery, wherein the electrolyte addition amount of each battery was 35 uL. After the open-circuit voltage was measured, a subsequent electrochemical-related test was performed.

Electrochemical Properties Test

[Battery Cycle Life Test]

Figure 2:
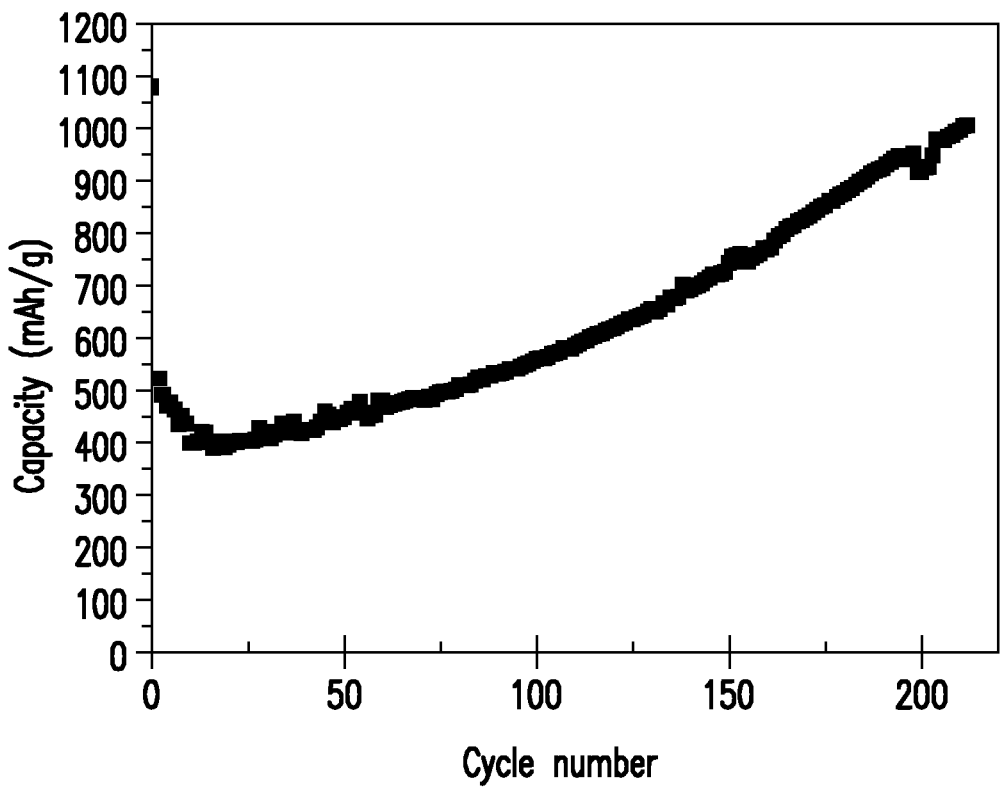
FIG. 2 is a cycle life curve of the battery of example 1.

A capacity test of battery cycle life was performed on the button-type battery prepared in example 1 at 15° C. to 30° C. and a voltage of 0.01 V to 3 V. FIG. 2 is a cycle life curve of the battery of example 1. It can be seen from FIG. 2 that, the capacity of the battery formed by the Sn—Mn—Ni-oxide of the invention is not degraded at a high cycle number (>250), but is increased instead, and therefore the battery has good stability. Moreover, in comparison to commercial graphite (capacity theoretical value of 372 mAh/g), a battery for which the Sn—Mn—Ni-oxide of the invention is used as the electrode material has higher capacity, and therefore the Sn—Mn—Ni-oxide of the invention can effectively improve battery performance.

[Reduction Potential Test]

Cyclic voltammetry was performed on the battery of example 1 using a potentiostat and cyclic potential scanning was performed in the potential range of 0.01 V to 3 V at a rate of 0.1 mV/sec.

Figure 3:
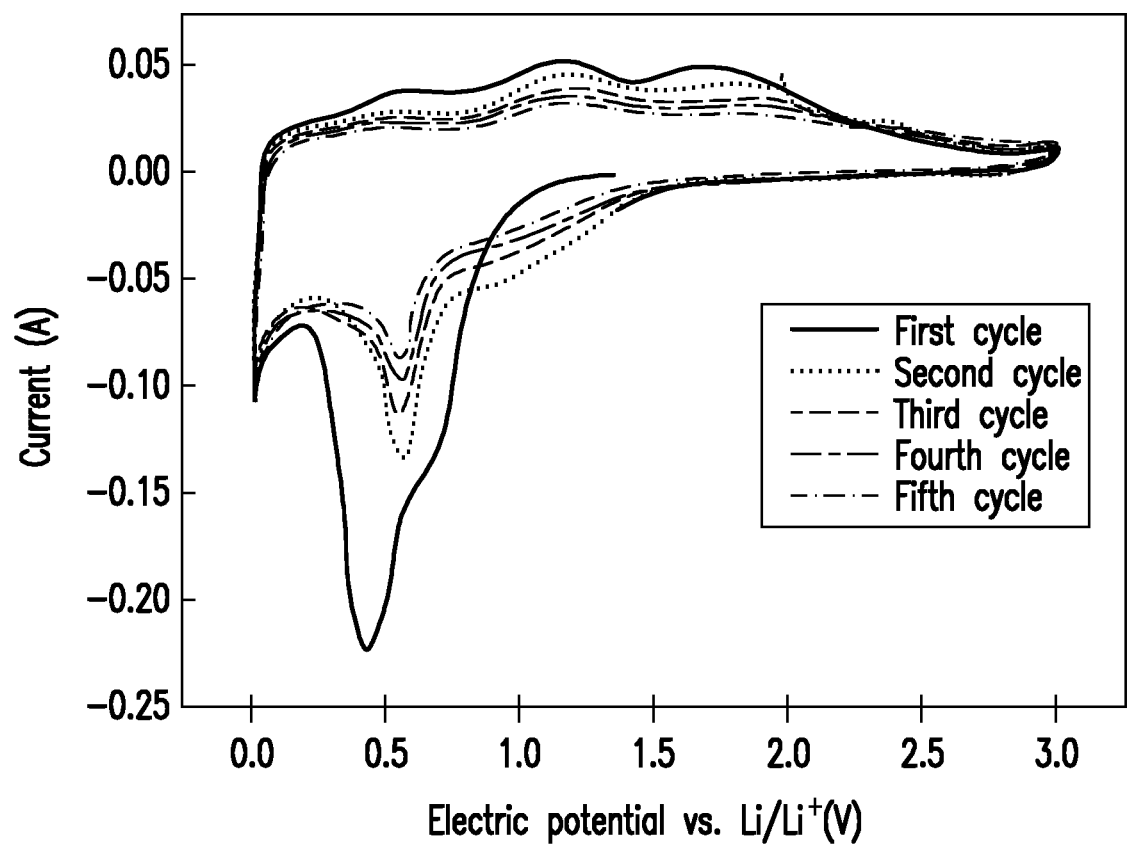
FIG. 3 is a cyclic voltammogram of the battery of example 1.

FIG. 3 is a cyclic voltammogram of the battery of example 1. It can be known from FIG. 3 that, a reduction current peak is between potentials 0.435 V and 1.5 V. In other words, the reduction potential of the Sn—Mn—Ni-oxide is about 0.435 V to 1.5 V.

Based on the above, the electrode material for the secondary battery of the embodiments may be applied in a secondary battery to provide the secondary battery with good stability, battery efficiency, and charge and discharge cycle life.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An anode material for a secondary battery, comprising:
a tin-manganese-nickel (Sn—Mn—Ni)-oxide represented by formula (1) below, $$Sn_xMn_yNi_zO_w \quad (1),$$

wherein $0.1 \leq x \leq 0.9$, $0.1 \leq y \leq 0.9$, $0.1 \leq z \leq 0.9$, and $(x+y+z)/2 < w < (x+y+z) \times 3$.

2. The anode material for the secondary battery of claim 1, wherein the Sn—Mn—Ni-oxide is a monocrystalline, microcrystalline, polycrystalline, or amorphous material.

3. The anode material for the secondary battery of claim 1, wherein the anode material for the secondary battery is single-phase or multi-phase.

4. The anode material for the secondary battery of claim 1, wherein the anode material for the secondary battery further comprises a binary metal oxide formed by an oxygen element and one of Mn, Ni, and Sn elements, a ternary metal oxide formed by an oxygen element and two of Mn, Ni, and Sn elements, or a combination thereof.

5. A secondary battery, comprising:
a cathode;
an anode separately disposed from the cathode, and the anode comprises the anode material for the secondary battery in claim 1;
an electrolyte disposed between the cathode and the anode; and
a package structure covering the anode, the cathode, and the electrolyte.

6. The secondary battery of claim 5, further comprising a separator disposed between the anode and the cathode, the separator, the anode, and the cathode define a housing region, and the electrolyte is disposed in the housing region.

* * * * *